(12) United States Patent
Frydendal et al.

(10) Patent No.: US 12,352,308 B2
(45) Date of Patent: Jul. 8, 2025

(54) FLUID FILM BEARING COMPRISING BEARING PADS AND METHOD OF REPLACING BEARING PADS

(71) Applicant: Siemens Gamesa Renewable Energy A/S, Brande (DK)

(72) Inventors: Niels Karl Frydendal, Herning (DK); Kim Thomsen, Skørping (DK); Morten Thorhauge, Ry (DK); Anders Vølund, Vanløse (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 127 days.

(21) Appl. No.: 18/367,886

(22) Filed: Sep. 13, 2023

(65) Prior Publication Data
US 2024/0093723 A1 Mar. 21, 2024

(30) Foreign Application Priority Data

Sep. 21, 2022 (EP) ..................................... 22196823

(51) Int. Cl.
| | |
|---|---|
| *F16C 17/03* | (2006.01) |
| *F16C 17/04* | (2006.01) |
| *F16C 33/08* | (2006.01) |
| *F16C 43/02* | (2006.01) |

(52) U.S. Cl.
CPC .............. *F16C 17/03* (2013.01); *F16C 17/04* (2013.01); *F16C 33/08* (2013.01); *F16C 43/02* (2013.01); *F16C 2360/31* (2013.01)

(58) Field of Classification Search
CPC .......... F16C 17/03; F16C 17/06; F16C 33/08; F16C 33/26; F16C 2237/00; F05D 2240/53; F05B 2230/80; F05B 2240/53
See application file for complete search history.

(56) References Cited

U.S. PATENT DOCUMENTS

| | | | |
|---|---|---|---|
| 8,936,397 B2* | 1/2015 | Pedersen ................. | F16C 43/02 384/282 |
| 9,145,869 B2* | 9/2015 | Thomsen ................ | F03D 80/70 |
| 11,280,320 B2* | 3/2022 | Claramunt Estecha ..................... | F16C 17/10 |
| 11,486,446 B2* | 11/2022 | Hoelzl .................... | F16C 17/02 |

(Continued)

FOREIGN PATENT DOCUMENTS

| | | |
|---|---|---|
| EP | 2511521 A1 | 10/2012 |
| EP | 3460272 A1 | 3/2019 |

(Continued)

OTHER PUBLICATIONS

European Search Report issued on Mar. 6, 2023 for application No. 221936823.3.

*Primary Examiner* — James Pilkington

(57) ABSTRACT

A fluid film bearing for a rotor hub of a wind turbine includes a first part and a second part rotatably coupled to each other about a longitudinal axis. The first part includes an annular first sliding surface extending in the circumferential direction of the fluid film bearing along the first part. In addition, the second part includes a support structure and a first group of bearing pads coupled to the support structure and having a bearing pad sliding surface configured to slide on the first sliding surface. In addition, the fluid film bearing further includes a seal arranged between the first part and the second part.

3 Claims, 2 Drawing Sheets

(56) References Cited

U.S. PATENT DOCUMENTS

Figure 1:
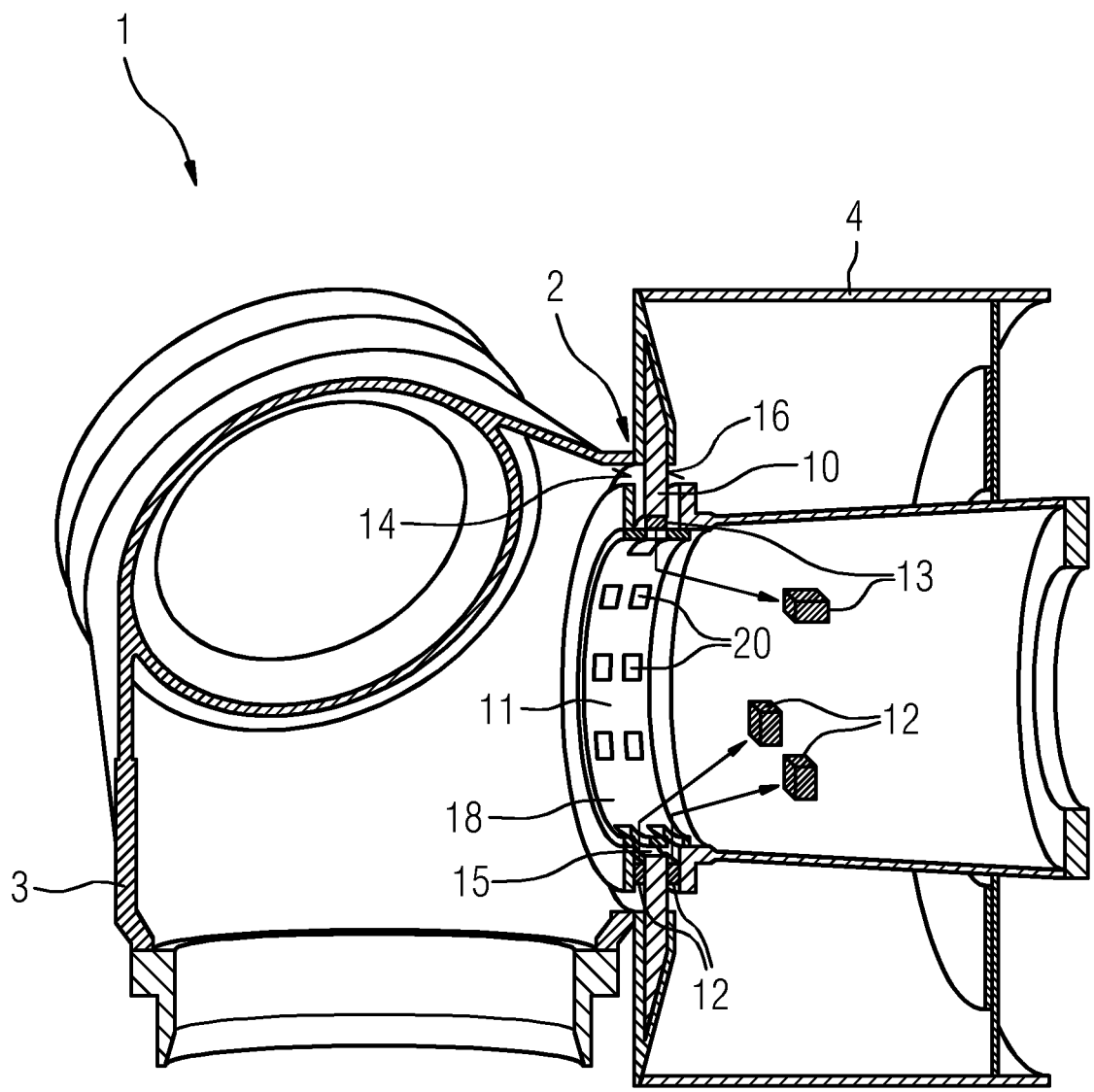

| | | | |
|---|---|---|---|
| 12,049,921 B2 * | 7/2024 | Julliand | ................ F16C 17/107 |
| 12,123,402 B2 * | 10/2024 | Waldl | ...................... F16C 17/10 |
| 2012/0263598 A1 | 10/2012 | Thomsen et al. | |
| 2022/0128043 A1 | 4/2022 | Moughon | |

FOREIGN PATENT DOCUMENTS

| | | |
|---|---|---|
| EP | 3767118 A1 | 1/2021 |
| EP | 3904711 A1 | 11/2021 |
| EP | 4043743 A1 | 8/2022 |
| KR | 20180023733 A | 3/2018 |
| WO | 2013034391 A2 | 3/2013 |

\* cited by examiner

FLUID FILM BEARING COMPRISING BEARING PADS AND METHOD OF REPLACING BEARING PADS

CROSS-REFERENCE TO RELATED APPLICATIONS

This application claims priority to EP Application No. 22196823.3, having a filing date of Sep. 21, 2022, the entire contents of which are hereby incorporated by reference.

FIELD OF TECHNOLOGY

The following relates to a fluid film bearing comprising bearing pads. The following further relates to a method of replacing bearing pads in a fluid film bearing.

BACKGROUND

Wind turbines are increasingly used for the generation of electrical energy. A wind turbine comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator. Hence, the rotational energy of the blades is transferred to the generator, which then converts the mechanical energy into electricity and transfers the electricity to the electrical grid.

In wind turbines, rotatable components like the hub or a rotatable shaft have to be supported on the stationary parts of the wind turbine. Therefore, one or more bearings are used. Due to the loads, which act on the rotatable parts of the wind turbine during operation, a bearing used to support the rotatable components of the wind turbine on the stationary components may suffer from wear or damage so that repair procedures and/or maintenance procedures for maintaining the functionality of the bearing involving a removal of the bearing from the wind turbine are frequently required. However, due to the size and the weight of the bearings, especially of a main bearing of a wind turbine, these procedures may be tedious and involve external cranes and, in the case of offshore wind turbines, also the usage of vessels for supporting the external crane used for removal and/or replacement of the bearing.

In EP 3 460 272 A1, a method for changing a bearing component of a main bearing of a wind turbine is described. The bearing component is unloaded by mechanically moving the shaft, wherein the bearing component is then moved axially from or into its mounting position by means of a replacement tool device. This procedure is burdensome and requires a lot of equipment and complex manoeuvres.

In particular for fluid film bearings, such as the one disclosed in document WO 2013/034391 A2, which comprise a plurality of bearing pads mounted on a bearing ring to allow the rotation of the components, the high loads transferred by the bearing have to be supported by the bearing pads, which due to the sliding movement allowing the rotation of the bearing are prone to wear.

Especially fluid film bearings for relatively heavy and strongly loaded parts, like the hub of a wind turbine, endure high wear and tear at the sliding surfaces of the bearing pads. While this wear and tear is reduced with the fluid film developing between the bearing pad sliding surface and the sliding surface of the bearing ring, a certain amount of wear and tear is still unavoidable, since the fluid film is only established in these bearings once a certain rotational speed is reached. Thus, it is necessary to exchange the pads of fluid film bearings in specific intervals to ensure a correct function of the fluid film bearings.

The bearing pads are arranged between the two rings of the bearing and do not have an easy access for the service tasks. An exchange of bearing pads of fluid film bearings is problematic, as to provide access to the bearing pads, it is necessary to provide a dedicated crawl space allowing access to the space between the rings.

Alternatively, access to the bearing pads can be provided from within the bearing. It is known from EP 3 904 711 A1 that bearing pads can be exchanged through openings or windows in the support structure of the bearings. According to this document, for each bearing pad a window is provided at the support structure to allow the replacement of each single bearing pad through the respective window. The window is positioned close to the pad so that a direct replacement through the window is possible. The method presented in this document provides an efficient and cheaper way of replacing bearing pads compared to other methods of hoisting the bearing components out of the wind turbine for replacement, but each window at the support structure weakens the structural integrity of the bearing. This solution can only be applied for a limited number of bearing pads, which greatly restricts the loads that can be transferred by the bearing and thus the potential load capacity of the bearing. However, the increasing size of wind turbines and the increasing loads modern wind turbines have to endure require a high number of pads to be able to support these high loads. Hence, the solution presented in document EP 3 904 711 A1 is not suitable for modern wind turbines.

SUMMARY

An aspect relates to provide a fluid film bearing for wind turbines with a reduced complexity and cost that is also service friendly. An aspect further relates to provide a method for replacing fluid film bearing pads which is easier to carry out than the ones known in the art.

According to embodiments of the invention, a fluid film bearing for a rotor hub of a wind turbine comprises a first part and a second part rotatably coupled to each other about a longitudinal axis. The first part comprises an annular first sliding surface extending in the circumferential direction of said fluid film bearing along the first part. The second part comprises a support structure and a first group of bearing pads coupled to the support structure and having a bearing pad sliding surface configured to slide on the first sliding surface.

The bearing pads can be tilting bearing pads or non-tilting bearing pads or a combination of both and support the rotatable part of the bearing on the stationary part of the bearing in an axial and/or radial direction.

A bearing pad may comprise several components, e.g., an outer bearing part, a support part for attachment to a structure by bolts or similar, a tilting support part to ensure that the bearing pad is able to tilt and/or a resilient means like e.g. a spring to ensure a preloading of the bearing pad and the tilting support.

In a fluid film bearing, a fluid film develops between the bearing pad sliding surface and the annular first sliding surface of the first part. Depending on the configuration, the first part can be the rotating part of the bearing. Alternatively, the first part can be the stationary part of the bearing.

The pad sliding surface, the annular first sliding surface and any other sliding surfaces discussed below can be coated to further reduce friction, e.g., with babbitt, white metal, a polymer or some other material. Different sliding surfaces can be coated with different material or the same material. It is also possible to leave some or all of the sliding surfaces without a coating or other surface treatment.

According to embodiments of the invention, the fluid film bearing further comprises a seal arranged between the first part and the second part for sealing an inner space of the fluid film bearing in which the bearing pads are arranged. The seal covers an opening of the inner space. By having a seal, a leakage of the lubricant used in the sliding surfaces of the fluid film bearing is prevented, as a leakage may damage other components of the drive train such as the generator or other electrical component such as actuators.

According to embodiments of the invention, the seal is detachable, wherein the opening is wide enough for allowing a replacement of a plurality of bearing pads through the opening when the seal is detached. A detachable seal which is wide enough allows to exchange bearing pads through the seal.

According to an embodiment of the invention, the first group of bearing pads comprises axial bearing pads. Axial bearing pads support the first part on the second part, in particular on the support structure of the second part, axially. The first part is the rotatable part supported on the second part, which is the stationary part, in an axial direction.

Axial bearing pads can be replaced in radial direction through the opening when the seal is detached. This eases the replacement of axial bearing pads compared to the methods known in the conventional art.

According to another embodiment of the invention, the first part further comprises an annular second sliding surface extending in the circumferential direction of said fluid film bearing along the first part. The second part further comprises a second group of bearing pads coupled to the support structure and having a bearing pad sliding surface configured to slide on the second sliding surface. The second group of bearing pads comprises radial bearing pads.

To allow for a smooth rotation of the inner and outer part with respect to each other all used sliding surfaces are essentially parallel to the circumferential direction of the bearing. Small angles of e.g. less than one degree between the surface of the respective sliding surface and the circumferential direction can appear due to tolerances during production, a misalignment of components, etc.

According to another embodiment of the invention, the first part further comprises an annular third sliding surface extending in the circumferential direction of said fluid film bearing along the first part. The second part further comprises a third group of bearing pads coupled to the support structure and having a bearing pad sliding surface configured to slide on the third sliding surface. The third group of bearing pads comprises axial bearing pads.

According to another embodiment of the invention, the support structure comprises a plurality of windows for replacing the bearing pads. Some bearing pads, such as radial bearing pads, might not be accessible from the opening of the seal. Hence, having additional windows at the support structure allows to reach these bearing pads. However, only the necessary windows should be drilled at the support structure, as windows in the support structure weaken the support structure, because drilling windows in the support structure weakens the material around the window, which may lead to cracks in the bearing. Mechanical stress may further create a risk of fractures in the material and the region of window is prone to such fractures due to the weaker material properties. Hence, less windows result in a strengthened support structure compared to the support structures known from the conventional art.

At least a part of the plurality of windows for replacing the bearing pads are axial windows arranged circumferentially for axially displacing the bearing pads through the windows for replacing the bearing pads. Hence, the axial bearing pads are removable and/or insertable through the axial windows. By providing the windows in the circumference of the stationary part, a removal and an insertion of the sliding pads in the axial direction is enabled.

At least a part of the plurality of windows for replacing the bearing pads are radial windows arranged circumferentially for radially displacing the bearing pads through the windows for replacing the bearing pads. Hence, the bearing pads are removable and/or insertable through the radial windows. By providing the windows in the circumference of the stationary part, a removal and an insertion of the sliding pads in the radial direction is enabled.

According to another embodiment of the invention, the windows are arranged at the outer circumference of the second part.

At least some bearing pads are replaced from an interior of the stationary part through a window in the outer circumference of the stationary part. The replacement of the bearing pad from an interior of the stationary part, hence the removal of the bearing pad and the insertion of a replacement bearing pad, has the advantage that the bearing pads are easily accessible from the interior of the stationary part, in particular when the bearing is used as a main bearing in a wind turbine.

According to another embodiment of the invention, the first part is arranged on an outer circumference of the second part and/or radially outwards of the second part. With this configuration, the pads are more easily accessible as they can be replaced from the radially inner part of the second part through windows or through the radially outer part through the opening.

According to another embodiment of the invention, the first part is a rotatable part, and the second part is a stationary part.

The bearing pads thus support the rotatable part of the bearing on the stationary part of the bearing in an axial and/or radial direction.

The bearing pads may be arranged for instance in between the annular rotatable part and a stationary part of the bearing supporting the rotatable part on the stationary part.

The stationary part may be for instance a hollow shaft, or connected to a hollow shaft, respectively, wherein the bearing pads are accessible from the interior of the hollow shaft through one or more windows in the outer circumference of the stationary part and through the opening left when the seal is detached. The bearing pads, which are arranged for instance between the outer circumference of the stationary part and the rotatable part arranged on an outer circumference of the stationary part and supported by the bearing pads on the stationary part, may be removed and/or replaced at least partly in a radial direction towards the exterior through the opening left by the detached seal, hence away from the centre, of the stationary part. In addition, the stationary part may provide one or more windows in its outer circumference, which allow to access the bearing pads which cannot be replaced through the opening left by the detached seal.

According to another embodiment of the invention, the fluid film bearing comprises an annular rotatable part, a stationary part and a plurality of bearing pads, wherein the stationary part is annular and the rotatable part is arranged on a circumference of the stationary part, wherein the rotatable part is supported on the stationary part by the bearing pads in a radial and/or an axial direction, wherein the stationary part comprises a plurality of axial and/or radial windows arranged circumferentially and/or axially displaced in the circumference of the stationary part, wherein the bearing pads are removable and/or insertable through the windows.

By providing the windows in the circumference of the stationary part, an axial and/or radial removal and/or an axial and/or radial insertion of the bearing pads is enabled. The rotatable part may be arranged either on an inner circumference of the stationary part or on an outer circumference of the stationary part.

Bearing pads that support a rotatable part arranged on the outer circumference of the stationary part may be removed in a radial inward direction towards a centre point of the annular stationary part through a window or in a radial outward direction away from the centre point of the annular stationary part through the opening left by the detached seal. Correspondingly, bearing pads that support a rotatable part on the inner circumference of the stationary part may be replaced in a radially outward direction through the windows in the circumference of the stationary part or in a radially inward direction through the opening left by the detached seal. Radially supporting bearing pads may be removed for instance from an inside of the bearing by moving them axially out of a cavity, or a recess, respectively, comprising an axial window and housing the radially supporting bearing pad.

According to another embodiment of the invention, the bearing pads are kept in position between the first part and the second part by coupling means applying a load between the first part and the second part, thereby applying a force to the bearing pads arranged between the first part and the second part and preventing the bearing pads to shift. The coupling means are configured to release the load between the first part and the second part by untightening the coupling means.

According to another embodiment of the invention, the coupling means are bolts.

The bearing pads are fixed to the bearing by a bolted connection applying a force to the bearing pad, wherein the force is released by untightening of the bolted connection, and/or by a form-fit connection.

In an embodiment of the invention, the bearing comprises an actuator arrangement with one or more actuators, in particular at least one mechanical actuator and/or at least one hydraulic actuator, wherein the actuator arrangement is adapted for removing a load of the rotatable part from at least one of the bearing pads. The at least one actuator of the actuator arrangement may be arranged inside a bearing case of the bearing. It is also possible that the at least one actuator is mounted to an outside of a bearing case of the bearing, wherein a coupling of the actuator towards the rotatable part and the stationary part occurs for instance via a piston. It is also possible that the bearing comprises at least one mechanical actuator and at least one hydraulic actuator, wherein the at least one mechanical actuator is used to secure the rotatable part displaced by the at least one hydraulic actuator in the displaced position.

In an embodiment of the invention, the at least one actuator of the actuator arrangement is arranged circumferentially displaced from the bearing pads. The bearing pads may be arranged between the stationary part and the rotatable part circumferentially and/or axially displaced for supporting the rotatable part both in the radial and/or the axial direction on the stationary part. The at least one actuator of the actuator arrangement is arranged circumferentially displaced from each of the bearing pads. By providing an actuator arrangement comprising a plurality of actuators, the individual actuators may be arranged for instance circumferentially in between the bearing pads so that a compact size of the bearing is obtained.

In an embodiment of the invention, the actuator arrangement comprises at least one radial actuator arranged at least partly in between the stationary part and the rotatable part for applying a radial force on the rotatable part and/or at least one axial actuator arranged at least partly between the rotatable part and a protrusion on the circumference of the stationary part for applying an axial force on the rotatable part. The protrusion may be for instance a bearing cover mounted to the stationary part or a protrusion of the circumference of the stationary part. The protrusion may protrude from the circumference in particular adjacently to the rotatable part, so that at least one actuator may be arranged between the protrusion and the rotatable part for applying a force on the rotatable part for unloading one or more of the bearing pads.

The bearing comprises a bearing case, wherein the actuator arrangement is arranged inside the bearing case. The bearing case may be formed for instance at least partly by a bearing cover and/or the rotatable part and/or the stationary part, wherein the bearing case houses in particular the contact area between the bearing pads, the rotatable part and/or a fluid used in the bearing.

Hence, bearing pads typically comprise a contact area that forms the sliding surface of the pad, also named the bearing pad sliding surface, and a support part, such as a bearing case, used to mount the contact area to the second part. The connection between the contact area and the support part typically allows the contact area to tilt in at least one direction to compensate for slight misalignments of the inner and outer part and for tolerances. The contact area can be connected to the support part e.g., by a pivot, a ball-in-socket connection or a flex support. Various approaches for providing such pads are known in the conventional art. It should be noted that in some cases only the contact area is considered to be the pad and the support part is considered to be the pad support. The connection between the contact area and the support part can also be formed as a single piece, e.g., in the case of a flex support, the combination of these parts can simply be referred to as pad.

The one or more actuators of the actuator arrangement each are fixed to the stationary part or the rotatable part of the bearing. During actuation of the at least one actuator, the actuator fixed to one of the parts of the bearing may couple to the respective other part of the bearing to apply a force on the other part to create a displacement between the stationary part and the rotatable part causing an unloading of at least one of the bearing pads of the bearing. The at least one actuator may be attached directly or indirectly to the stationary part or the rotatable part, respectively.

In an embodiment of the invention, the force is applied to the first part using the actuator arrangement comprising at least one actuator, in particular at least one mechanical actuator and/or at least one hydraulic actuator. The at least one actuator of the actuator arrangement may push away the first part from the bearing pad, so that the bearing pad is unloaded from the weight of the first part. Therefore, already a small displacement, for instance about 1 mm, is sufficient. By the actuator arrangement, a force to the first part can be applied prior to the replacement of the bearing pad and removed after replacement of the bearing pad, respectively. As a hydraulic actuator, for instance a hydraulic jack may be used.

The actuator arrangement and/or the bearing may comprise a mechanical fixture device which fixes the first part in its displaced position for securing it for instance in the event of a power loss of a hydraulic actuator. As mechanical actuator, for instance a screw or a threaded bolt may be used to push away the first part from the second part. It is possible that at least one mechanical actuator and at least one hydraulic actuator are used, wherein the at least one mechanical actuator is used as mechanical fixture device to secure the first part displaced by the at least one hydraulic actuator in the displaced position.

An axial force on the first part of the bearing for replacement of an axially supporting bearing pad and/or a radial force for replacement of a radially supporting bearing pad is applied by the actuator arrangement. For replacement of a bearing pad, which supports the first part of the bearing in a radial direction on the second part, a radial force may be applied to the first part by the actuator arrangement unloading the radially supporting bearing pad. Correspondingly, for unloading an axially supporting bearing pad, an axial force may be applied to the first part by the actuator arrangement for unloading the axially supporting bearing pad. For unloading a bearing pad, which supports the first part both in a radial and in an axial direction, a combination of a radial force and an axial force can be applied to the rotatable part using the actuator arrangement. The actuator arrangement may comprise one or more radial actuators, which can apply each a radial force, and/or one or more axial actuators, which can apply each an axial force.

In an embodiment of the invention, at least one actuator of the actuator arrangement is detachably mounted to the bearing prior to the removal of the load from the bearing pad to be replaced and/or at least one actuator of the actuator arrangement is permanently mounted to the bearing. The unloading of the bearing pad can be conducted using an actuator arrangement which is permanently mounted to the bearing. This allows for instance to arrange the at least one actuator of the actuator arrangement inside a bearing case, so that the actuator can act directly on the first part of the bearing.

It is also possible that at least one actuator of the actuator arrangement is detachably mounted to the bearing prior to the removal of the load from the bearing pad to be replaced, so that no actuator has to be provided as part of the bearing.

An actuator of the actuator arrangement mounted in the course of the replacement procedure may be attached for instance to an outer side of a bearing case of the bearing, wherein the force created by the at least one actuator is applied for instance by coupling a piston of the actuator to the rotatable part of the bearing. The actuator may be fixed on either the stationary part or the rotatable part, wherein the actuator is coupled to the respective other part allowing a displacement between the rotatable part and the stationary part of the bearing to unload one or more of the bearing pads. For coupling, the piston of the actuator may be arranged inside an orifice of a bearing cover, the stationary part and/or the rotatable part, respectively.

In an embodiment of the invention, prior to the insertion of the replacement bearing pad, a surface treatment of a surface of the stationary part and/or a surface of the rotatable part is conducted. The surface treatment may be for instance a surface milling operation conducted to clean and/or to repair a surface of the stationary part and/or a surface of the rotatable part. This allows to clean the surface at the position of the bearing pad, so that for instance dirt and/or residues from the bearing pad can be removed from the surfaces. Also corrosion and/or fretting effects can be removed by the surface treatment.

Therefore, a portable machining device may be mounted in the space where the bearing pad is usually mounted. The surface milling operation may be carried out for instance on an interface of the stationary part with the bearing pad to remove affected material. The milling device may include a cover arrangement adapted to the size of a window of the outer circumference of the stationary part, in which the milling device is inserted. By the cover arrangement, the surface that is subject to the surface treatment may be covered to seal the treated surface from the surrounding, in particular from the interior of the bearing. This may prevent contamination of an interior of the bearing, hence an undesired intrusion of dust or the like created during the surface treatment into an interior of the bearing is inhibited advantageously.

According to another embodiment of the invention, each bearing pads is arranged in a cavity or a recess of the support structure.

The bearing pad may be arranged in a cavity or a recess of the stationary part. By untightening the bolted connection, the force may be removed to unload the bearing pad, so that it can be removed for instance towards the interior of the stationary part. Vice versa, the replacement bearing pad can be inserted and fixed again to the bearing by tightening of the bolted connection after the replacement of the bearing pad. The bolted connection may apply a force to the bearing pad enabling a support of the rotatable part on the bearing pad. By untightening the bolted connection, the force can be removed from the bearing pad and the bearing pad is unloaded, or the rotatable part is unsupported from the bearing pad, respectively. Vice versa, by tightening of the bolted connection, the force can be applied again to the bearing pad re-establishing the support of the rotatable part on the bearing pad. Additionally, or alternatively, the bearing pad is fixed to the bearing by a form-fit connection, wherein the bearing pad is arranged in a cavity or a recess of the stationary part. The cavity or the recess may be in particular an integral part of the stationary part and may be located in particular in its outer circumference. The bearing pad may be fixed in the cavity or the recess, respectively, by the rotating part resting on the bearing pad. One side of the cavity, or the recess, respectively, may comprise an axial window for replacement of an unloaded bearing pad, in particular a radially supporting bearing pad.

According to another embodiment of the invention, the seal is a sealing ring. The sealing ring covers the inner space of the fluid film bearing in which the bearing pads are arranged from a radially outer position of the fluid film bearing. In this case, the bearing pads are replaced by shifting the pads radially outwards. A sealing ring provides a cover for the opening around the circumference of the opening.

According to another embodiment of the invention, the seal is coupled to the first part or to the second part by seal coupling means. Seal coupling means can be bolts, screws, pins, rivets, threads, studs, or any other longitudinal fasteners used for releasably coupling the seal to the first part or to the second part.

Yet another aspect of embodiments of the invention relates to a method of replacing bearing pads of a fluid film bearing for a rotor hub of a wind turbine. The fluid film bearing comprises a first part and a second part rotatably coupled to each other about a longitudinal axis. The first part comprises an annular first sliding surface extending in the circumferential direction of said fluid film bearing along the first part. The second part comprises a support structure and a first group of bearing pads coupled to the support structure and having a bearing pad sliding surface configured to slide on the first sliding surface.

The fluid film bearing further comprises a seal arranged between the first part and the second part for sealing an inner space of the fluid film bearing in which the bearing pads are arranged, wherein the seal covers an opening of the inner space. The seal is detachable, wherein the opening is wide enough for allowing a replacement of a plurality of bearing pads through the opening when the seal is detached.

According to the method, the bearing pads are replaced through the opening by following the following steps:
  detaching the seal from the opening arranged between the first part and the second part sealing the inner space of the fluid film bearing in which the bearing pads are arranged,
  reducing a load between the first part and the second part by releasing a force applied to a first bearing pad and/or by applying a force to the first part and/or the second part,
  displacing the first bearing pad for reaching the opening,
  pulling the first bearing pad through the opening,
  inserting a replacement first bearing pad through the opening and displacing the replacement first bearing pad to the original position of the replaced first bearing pad,
  increasing the load between the first part and the second part by increasing the force applied to the replacement first bearing pad and/or by applying a force to the first part and/or the second part so that the replacement first bearing pad is kept in position, and
  attaching the seal at the opening.

The load between the first part and the second part can be removed by releasing a force applied to the bearing pad and/or by applying a force to the first part and/or the second part, so that one or more of the bearing pads become unloaded. When the load is removed at a part of the bearing, the weight of the bearing and of the components supported by the bearing is supported via the remaining bearing pads. The unloading of a bearing pad to be replaced may occur by removing a force, which acts on the bearing pad pressing it towards the sliding surface of the first part of the bearing. After removing the force, the bearing pad is not tensioned anymore between the rotatable part and the stationary part. Additionally, or alternatively, the bearing pad to be replaced can also be unloaded by applying a force in particular directly to the first part, so that the first part is lifted and/or displaced and the weight of the first part is not supported anymore on the bearing pad to be replaced.

After removing the load, the unloaded bearing pad can be displaced in an axial and/or a radial direction of the bearing for reaching the opening. The bearing pad can be pulled in a radial outward direction away from the centre of the bearing, hence in the direction away from a centre point of the annular rotatable part in order to pull the bearing pad through the opening. Alternatively, the bearing pad can be removed through a window of the support structure. Also a combination of an axial and a radial movement for removing the bearing pad is possible. The removal of the bearing pad at least partly in a radial direction has the advantage that no access, or a reduced access space, respectively, from the axial direction to the fluid film bearing is required. Furthermore, both bearing pads that support the bearing in the axial direction and bearing pads that support the first part in the radial direction on the second part can be removed at least partly in the radial direction facilitating the replacement of the bearing pad.

After the removal of the bearing pad, a replacement bearing pad is inserted at the position of the removed bearing pad. The replacement bearing pad may be for instance a new bearing pad or it can be the removed bearing pad, which has been subject to maintenance and/or repair procedures, for instance cleaning procedures or the like. Also, the insertion of the replacement bearing pad may occur in a radial direction, in particular in reverse direction to the removal of the bearing pad.

After insertion of the replacement bearing pad, the first part of the bearing is supported on the replacement bearing pad by applying a force to the replacement bearing pad and/or by removing the force applied to the first part. By applying a force to the replacement bearing pad, the replacement pad is pushed towards and/or pressed on the first part of the bearing, so that the first part is supported again on the bearing pad and therefore also supported on the second part of the bearing. Additionally, or alternatively, also the force, which has been applied to the first part for unloading the bearing pad, may be removed, so that the first part is supported on the bearing pad again.

The method for replacing the bearing pad according to embodiments of the invention has the advantage that the bearing pads can be exchanged in-situ and one by one, so that an exchange of the entire bearing is not required even if all bearing pads of the bearing have to be replaced. This facilitates the maintenance of the bearing, in particular for bearings used as main bearing in a wind turbine. Providing a plurality of bearing pads in the bearing allows for supporting the rotatable part on the stationary part on the remaining bearing pads of the bearing during the removal of the load of the rotatable part from one of the bearing pads, or a part of the bearing pads, respectively. This facilitates the repair and/or the maintenance of the fluid film bearing since for instance a one-by-one replacement of damaged or worn bearing pads becomes possible. Also an updating of the bearing by replacing the mounted bearing pads by improved bearing pads as replacement pads is possible.

Contrary to an exchange of the entire bearing, no external cranes and/or vessels are required. Furthermore, since only single bearing pads are removed or inserted, respectively, the replacement of the bearing pads may be performed manually and/or by usage of a lifting device manually installable prior to the replacement procedure in the vicinity of the bearing. This significantly reduces the effort for replacing one or more of the bearing pads of the bearing facilitating repair procedures and/or maintenance procedures and reducing their costs.

According to another embodiment of the invention, a second bearing pad is replaced through the opening following the steps for replacing the first bearing pad through the opening.

According to another embodiment of the invention, a rope or string is attached to the first bearing pad and/or to the second bearing pad for pulling the first bearing pad and/or the second bearing pad through the opening.

According to another embodiment of the invention, the first and second bearing pads are both replaced before the load between the first part and the second part is increased in the last step of the method.

Yet another aspect of embodiments of the invention relates to a wind turbine comprising a fluid film bearing for a rotor hub of said wind turbine. The fluid film bearing comprises a first part and a second part rotatably coupled to each other about a longitudinal axis. The first part comprises an annular first sliding surface extending in the circumferential direction of said fluid film bearing along the first part. The second part comprises a support structure and a first group of bearing pads coupled to the support structure and having a bearing pad sliding surface configured to slide on the first sliding surface.

The fluid film bearing further comprises a seal arranged between the first part and the second part for sealing an inner space of the fluid film bearing in which the bearing pads are arranged, wherein the seal covers an opening of the inner space. The seal is detachable, wherein the opening is wide enough for allowing a replacement of a plurality of bearing pads through the opening when the seal is detached.

For a wind turbine according to embodiments of the invention, the details and advantages of a fluid film bearing according to embodiments of the invention apply correspondingly. For a wind turbine according to embodiments of the invention and for a fluid film bearing according to embodiments of the invention, also the details and advantages of a method for replacement a bearing pad of a rotational fluid film bearing apply correspondingly.

BRIEF DESCRIPTION

Figure 2:
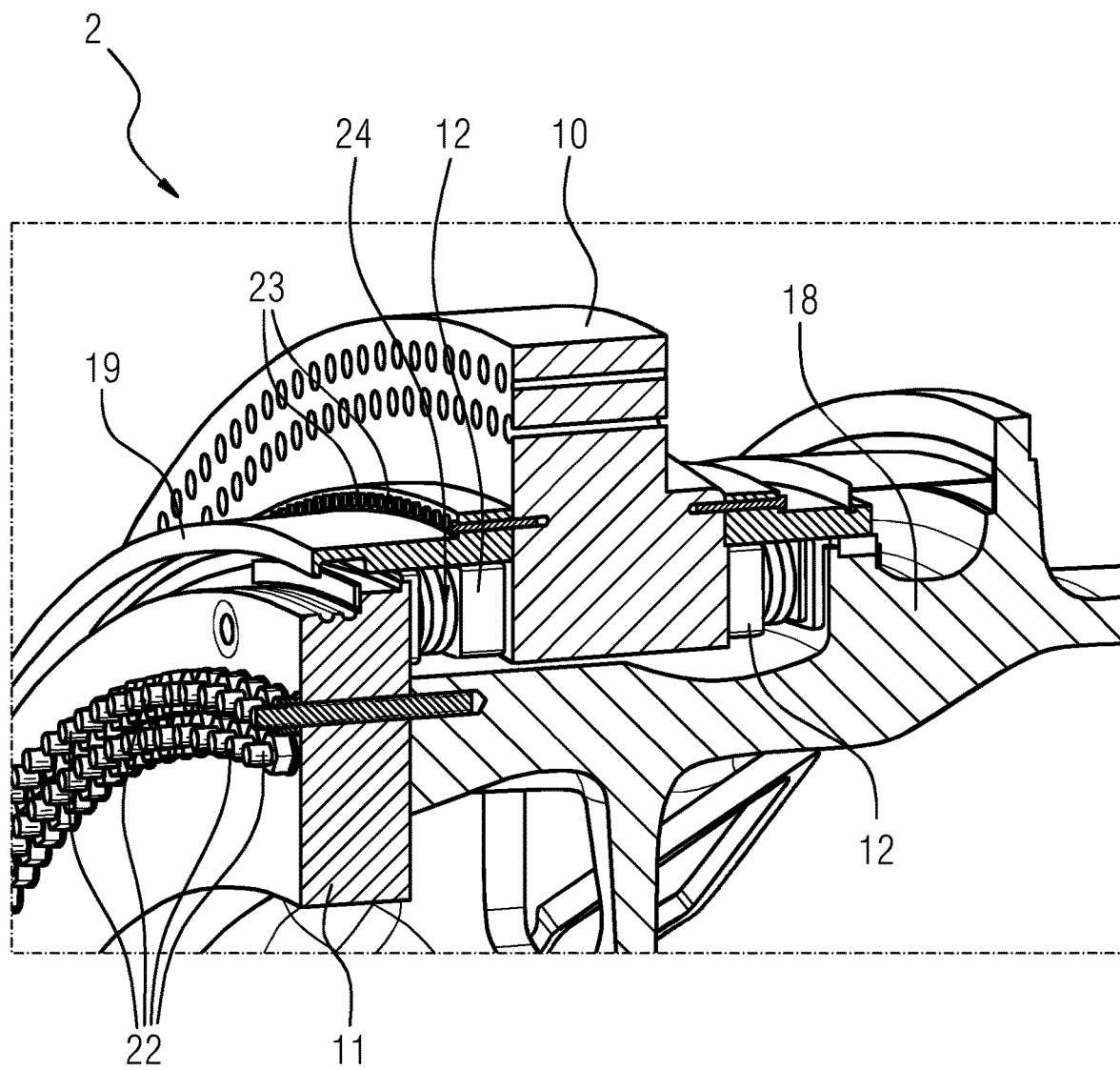

Some of the embodiments will be described in detail, with reference to the following figures, wherein like designations denote like members, wherein:

FIG. 1 shows a fragmentary view of a wind turbine as known in the art and in part further shows a schematic representation of a fluid film bearing that benefits from our disclosed methodology for replacing fluid film bearings; and FIG. 2 shows a fluid film bearing for a rotor hub of a wind turbine according to an embodiment of the present invention.

DETAILED DESCRIPTION

FIG. 1 shows a fragmentary view of a wind turbine 1, which as known in the art comprises a rotor hub 3 rotatably connected to a housing 4 of a generator of the wind turbine 1 using a fluid film bearing 2. The rotor hub 3 is mounted to a first part 10 of the fluid film bearing 2 using a torque-prove connection, for example a flange connection. Al-ternatively, the hub 3 and the first part 10 can be formed, e.g. cast, as a single piece.

The first part 10 is also connected to the housing 4 using a torque-prove connection. The housing 4 can be used to carry a rotor of a generator of the wind turbine 1 that is not shown in FIG. 1 for reasons of simplicity and clarity.

The second part 11 of the fluid film bearing 2 has an annular shape and can be formed as one piece or connected to a stator shaft which carries the stator of the generator of the wind turbine 1 that is not shown for reasons of simplicity and clarity.

Hence, the first part 10 is the rotatable part of the fluid film bearing 2 connected to the rotor hub 3 and to the housing 4 and the second part 11 is the stationary part of the fluid film bearing 2 connected to the stationary shaft supporting the stator of the generator.

Details concerning the lubrication of the fluid film bearing, e.g., seals and pumps that can optionally be used to transport the lubricant, are omitted in the present figure.

As noted above, an aspect of disclosed embodiments relates to improved methodology for replacing fluid film bearings for wind turbines with reduced complexity and cost and that is also service friendly. The disclosure below in connection with FIG. 1 is intended to provide context and facilitate understanding regarding our improved methodology. The bearing pads 12, 13 are distributed along a circumference of the second part 11 in three different groups for supporting the first part 10. The first and third group of bearing pads 12, 13 is a group formed by axial bearing pads 12, which slide on the first and third sliding surface 14, 16 respectively and provide axial support in both axial directions. The second group of bearing pads 12, 13 is a group formed by radial bearing pads 13, which slide on the second sliding surface 15 and provide radial support. Therefore, the first part 10 is supported in both axial directions and in the radial direction on the second part 11.

Each of the bearing pads 12, 13 has a respective bearing pad sliding surface 17 that supports the annular first sliding surface 14 and the annular third sliding surface 16 of the first part 10 in the axial direction and the annular second sliding surface 15 in the radial direction. The sliding surfaces 14, 15, 16 can e.g., be coated to improve the robustness of the sliding surface and/or further reduce friction. While the sliding surfaces 14, 15, 16 are typically not in direct contact during the normal operation, since a thin lubricant film is arranged between the sliding surfaces 14, 15, 16, contact between the sliding surfaces 14, 15, 16 can e.g., occur at slow rotating speeds or when pumps used to transport the lubricant are not working.

The bearing pad sliding surface 17 can have a convex shape. The convex shape of the bearing pad sliding surface 17 can match the shape of the respective annular sliding surface 14, 15, 16, that is at least approximately circular in the same sectional plane. Another advantage of using a convex surface is an avoidance of acute angles at the edges of the bearing pad sliding surface 17. This can help to reduce wear and tear of the bearing pad sliding surface 17 and the annular sliding surface 14, 15, 16.

Bearing pads 12, 13 typically allow a certain amount of tilting of the bearing pad sliding surface 17 of the respective bearing pad 12, 13 with respect to a support section of the bearing pad 12, 13 used to support the bearing pad 12, 13 against a mounting surface or some other mounting point. The bearing pad sliding surface 17 is typically provided by a contact section that is mounted to the support section by a mechanism to allow for the tilting, e.g., by a pivot or a ball-in-socket connection. It is also possible to provide a flex support as the mechanism that allows tilting. The contact section and the support section can be formed from the same material connected by a thinner part of the same material forming the mechanism allowing the tilting.

The first part 10 is arranged on an outer circumference of the second part 11. The support structure 18 of the second part 11 comprises a plurality of windows 20 providing access to the bearing pads 12, 13 for replacing the bearing pads 12, 13. Each window 20 corresponds to one bearing pad 12, 13, hence the number of windows 20 and the number of bearing pads 12, 13 is the same. In other words, for each bearing pad 12, 13 there is a window 20 in the support structure 18 for replacement of the bearing pad 12, 13.

As indicated by the arrows, the bearing pads 12, 13 are radially removed and the replacement pads inserted into windows 20 of the support structure 18 of the second bearing part 11 when they need to be replaced. As each bearing pad 12, 13 has a specific window 20 for this process, the bearing pad 12, 13 to be replaced is taken out of the seat in a radial direction towards the centre of the second part 12 of the fluid film bearing 2. This process applies to axial bearing pads 12 and to radial bearing pads 13.

After removal of bearing pads 12, 13 through the respective window 20, the bearing pads 12, 13 can then be transported out of the fluid film bearing 2 and out of the wind turbine 1.

After removal of bearing pads 12, 13 through the respective window 20, replacement bearing pads 12, 13 can be inserted through the respective windows 20 and be placed on the original position of the removed bearing pads 12, 13 between the support structure 18 and the first part 10.

In particular, the replacement of bearing pads 12, 13 may be performed manually or by using a lifting device manually installed prior to the replacement procedure in the vicinity of the fluid film bearing 2.

FIG. 2 shows a fluid film bearing 2 for a rotor hub 3 of a wind turbine 1 according to an embodiment of the present invention. The fluid film bearing 2 comprises a first part 10 and a second part 11 rotatably coupled to each other about a longitudinal axis.

The second part 11 comprises a support structure 18 and a first group of bearing pads 12, 13 coupled to the support structure 18.

The fluid film bearing 2 further comprises a seal 19, which is a sealing ring, arranged between the first part 10 and the second part 11 for sealing an inner space of the fluid film bearing 2 in which the bearing pads 12, 13 are arranged, wherein the seal 19 covers an opening 24 of the inner space. The seal 19 is detachable, wherein the opening 24 is wide enough for allowing a replacement of a plurality of bearing pads 12, 13 through the opening 24 when the seal 19 is detached.

The seal 19 is coupled to the first part 10 by seal coupling means 23, which are bolts as shown in the figure.

Although not shown in the figure, the support structure 18 can comprise windows 20 for replacing the bearing pads 12, 13 which cannot be replaced through the opening 24.

The bearing pads 12, 13 are kept in position between the first part 10 and the second part 11 by coupling means 22 applying a load between the first part 10 and the second part 11, thereby applying a force to the bearing pads 12, 13 arranged between the first part 10 and the second part 11 and preventing the bearing pads 12, 13 to shift. The coupling means 22 are configured to release the load between the first part 10 and the second part 11 by untightening the coupling means 22. The coupling means 22 are a bolted connection. In particular, the bearing pads 12, 13 are fixed to the fluid film bearing 2 by the bolted connection comprising a plurality of bolts exerting a pressure between the first part 10 and the second part 11. In a mounted state of the bearing pads 12, 13, a force is acting on the bearing pads 12, 13 due to the weight of the first part 10 and the second part 11 and/or due to the bolted connection.

The coupling means 22 can also be directly used to fix the bearing pads 12, 13 to the second part 11. By tightening the coupling means 22, more force is exerted from the bearing pad 12, 13 to the sliding surface 14, 15, 16. The bearing pads 12, 13 are fixed on the stationary part of the bearing 2 each by a bolted connection comprising a plurality of bolts.

After untightening the bolts, the bearing pads 12, 13, or the sliding part of the bearing pads 12, 13, can be removed from the fluid film bearing 2. Depending on the location of the opening 24 and of any possible further windows 20, the bearing pads 12, 13 are removed in a radial direction or in an axial direction. After insertion of the replacement bearing pads 12, 13, the load can be applied again to keep the bearing pads 12, 13 by tightening the coupling means 22.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE NUMBERS

1 Wind turbine
2 Fluid film bearing
3 Rotor hub
4 Housing
10 First part
11 Second part
12 Axial bearing pad
13 Radial bearing pad
14 First sliding surface
15 Second sliding surface (for radial pads)
16 Third sliding surface
17 Bearing pad sliding surface
18 Support structure
19 Seal
20 Window
22 Coupling means
23 Seal coupling means
24 Opening

The invention claimed is:

1. A method of replacing bearing pads of a fluid film bearing in a rotor hub of a wind turbine, the fluid film bearing comprising a first part and a second part rotatably coupled to each other about a longitudinal axis,
   wherein the first part comprises an annular first sliding surface extending in the circumferential direction of the fluid film bearing along the first part,
   wherein the second part comprises a support structure and a first group of bearing pads coupled to the support structure and having a bearing pad sliding surface configured to slide on the first sliding surface,
   wherein the fluid film bearing further comprises a seal arranged between the first part and the second part for sealing an inner space of the fluid film bearing in which the bearing pads are arranged,
   wherein the seal covers an opening of the inner space,
   wherein the seal is detachable,
   when the seal is detached, the opening permits replacement of a plurality of bearing pads through an opening of an inner space of the fluid film bearing,
   the method comprising:
   detaching the seal from the opening,
   reducing a load between the first part and the second part by releasing a force applied to a first bearing pad and/or by applying a force to the first part and/or the second part,
   displacing the first bearing pad to align with the opening,
   pulling the first bearing pad through the opening,
   inserting a replacement first bearing pad through the opening and displacing the replacement first bearing pad to the original position of the replaced first bearing pad,
   increasing the load between the first part and the second part by increasing the force applied to the replacement first bearing pad and/or by applying a force to the first part and/or the second part so that the replacement first bearing pad is kept in position, and
   reattaching the seal.

2. The method of replacing bearing pads of a fluid film bearing according to claim 1, wherein a second bearing pad is replaced through the opening following the steps for replacing the first bearing pad through the opening.

3. The method of replacing bearing pads of a fluid film bearing according to claim 2, wherein the first and second bearing pads are both replaced before the load between the first part and the second part is increased.

* * * * *